(12) United States Patent
Li et al.

(10) Patent No.: US 11,066,805 B2
(45) Date of Patent: Jul. 20, 2021

(54) MEASURING DEVICE AND METHOD FOR HORIZONTAL DYNAMIC IMPEDANCE OF SPECIFIED FOUNDATION DEPTH BASED ON DIFFERENTIAL RESPONSE ANALYSIS OF PULSE EXCITATION

(71) Applicant: Dalian University of Technology, Dalian (CN)

(72) Inventors: Jianbo Li, Dalian (CN); Weihong Liu, Dalian (CN); Zhiyuan Li, Dalian (CN); Gao Lin, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 257 days.

(21) Appl. No.: 16/477,184

(22) PCT Filed: Mar. 19, 2018

(86) PCT No.: PCT/CN2018/079425
§ 371 (c)(1),
(2) Date: Jul. 10, 2019

(87) PCT Pub. No.: WO2019/178715
PCT Pub. Date: Sep. 26, 2019

(65) Prior Publication Data
US 2020/0157763 A1 May 21, 2020

(51) Int. Cl.
*E02D 33/00* (2006.01)
*E02D 27/32* (2006.01)
(Continued)

(52) U.S. Cl.
CPC ............ *E02D 33/00* (2013.01); *E02D 27/32* (2013.01); *E02D 27/34* (2013.01); *G01H 15/00* (2013.01)

(58) Field of Classification Search
CPC combination set(s) only.
See application file for complete search history.

(56) References Cited

U.S. PATENT DOCUMENTS 5,325,702 A * 7/1994 Verstraeten ............. E02D 33/00
73/12.09
5,769,173 A * 6/1998 Egami ....................... E02D 7/18
173/114
(Continued)

FOREIGN PATENT DOCUMENTS

| CN | 103774701 A | 5/2014 |
|---|---|---|
| CN | 104563169 A | 4/2015 |
| CN | 105696637 A | 6/2016 |

*Primary Examiner* — Kyle Armstrong
(74) *Attorney, Agent, or Firm* — Muncy, Geissler, Olds & Lowe, P.C.

(57) ABSTRACT

A measuring device and method for horizontal dynamic impedance of specified foundation depth based on differential response analysis of pulse excitation. The measuring method is realized based on the measuring device. Two rigid piles with different lengths are embedded into different foundation depths. Motion characteristics of the two rigid piles in the process of collision impact with the outside are different under the same pulse excitation. Dynamic impedance of specified foundation depth is deduced from the formula according to the differential response. Single-degree-of-freedom oscillators are arranged on the pile heads of the two piles, and strain gauges are arranged on the bottoms of the single-degree-of-freedom oscillators to obtain stress states of the single-degree-of-freedom oscillators, thereby calculating the relative displacements of the single-degree-of-freedom oscillators. This is simple in structure, reliable in measurement and convenient in data collection and processing.

2 Claims, 2 Drawing Sheets

(51) Int. Cl.
*G01H 15/00* (2006.01)
*E02D 27/34* (2006.01)

(56) References Cited

U.S. PATENT DOCUMENTS

| | | | | |
|---|---|---|---|---|
| 5,796,173 A | * | 8/1998 | Selfors | F01D 15/10 |
| | | | | 180/165 |
| 2003/0122434 A1 | | 7/2003 | Shimada | |
| 2010/0030478 A1 | * | 2/2010 | Saitoh | G01M 7/08 |
| | | | | 702/14 |
| 2019/0316313 A1 | * | 10/2019 | Wang | G01L 5/0052 |

* cited by examiner

MEASURING DEVICE AND METHOD FOR HORIZONTAL DYNAMIC IMPEDANCE OF SPECIFIED FOUNDATION DEPTH BASED ON DIFFERENTIAL RESPONSE ANALYSIS OF PULSE EXCITATION

TECHNICAL FIELD

The present invention belongs to the field of detection of site dynamic characteristics of civil engineering, and relates to a measuring device and method for horizontal dynamic impedance of specified foundation depth based on differential response analysis of pulse excitation.

BACKGROUND

The structure and the foundation belong to one complete system. Analysis based on dynamic interaction between the structure and the foundation is an important way to obtain reliable data for seismic design and safety evaluation of the structure. The dynamic characteristics of the infinite foundation play a key role. In one aspect, the foundation provides necessary elastic support (static and dynamic bearing capacities) for the structure; and in another aspect, the geometrical features of the infinite foundation weaken the scattered wave caused by the structural vibration in the form of radiation damping. The two aspects are often characterized by the dynamic relationship between the foundation deformation and the interaction force at the structure-foundation interface, which is called the dynamic impedance of the foundation in the frequency domain.

Compared with the vertical earthquake, the dynamic response of the structure under the horizontal earthquake plays a greater role in the seismic design, so more attention is paid to the dynamic impedance value of the horizontal foundation. At present, numerical simulation is the most important means to calculate the dynamic impedance value of the foundation, such as finite element method, boundary element method or infinite element method. However, there is no effective experimental technique for the direct measurement of the dynamic impedance value of the foundation.

The dynamic characteristic of the foundation is a broad concept in many fields. Relevant dynamic test technologies mainly include: harmonic exciting method, cyclic triaxial test and resonant column testing method. The harmonic exciting method includes forced vibration method and free vibration method. The forced vibration test is to measure the comprehensive impedance coefficient of the ground surface by applying sine wave excitation of different frequencies to the foundation, including shear stiffness coefficient, damping ratio and participating mass of the ground surface. The free vibration method is to obtain the natural frequency of the foundation and the attenuation characteristics of a foundation-ground-based system by applying a pulse excitation to the foundation based on Fourier data analysis. The harmonic exciting method is mainly used in the measurement of dynamic impedance of the foundation surface of a small-scale mechanical foundation, and serves the vibration and shock isolation design of the mechanical foundation. The foundation of a building structure is quite different from the device foundation in size and quality as well as the dynamic relationship with foundation. The dynamic characteristics of a deeper foundation also contribute a lot to the dynamic response of the building structure.

In addition, the cyclic triaxial test and the resonant column testing method are mainly used to test the basic mechanical parameters of material particles in the site, such as damping ratio, dynamic elastic modulus and dynamic strength, rather than to measure the dynamic impedance value of the foundation. From the perspective of seismic analysis of the building structure, there is no method and device that can directly measure the horizontal dynamic impedance of the foundation at the specified depth in consideration of the natural vibration characteristics of the upper structure.

SUMMARY

In view of the problems in the prior art, the present invention provides a measuring device and method for horizontal dynamic impedance of specified foundation depth based on differential response analysis of pulse excitation. The measuring device is simple in structure, reliable in measurement and convenient in data collection and processing.

To achieve the above purpose, the present invention adopts the following technical solution:

A measuring device for horizontal dynamic impedance of specified foundation depth based on differential response analysis of pulse excitation comprises a bracket 1, a bidirectional electromagnetic exciter 2, single-degree-of-freedom oscillators 3, strain gauges 4, a raft 5, two rigid piles 6, a photosensitive band 7, laser sources 8 and an information collector 9.

The two rigid piles 6 with different lengths are embedded into different foundation depths. The two rigid piles 6 embedded into different foundation depths bear different lateral force of the soil layer, so that motion characteristics in the process of collision impact with the outside are different. Dynamic impedance of specified foundation depth is deduced from the formula according to the differential response. The single-degree-of-freedom oscillators 3 with different frequencies are arranged on pile heads of the two rigid piles 6 according to the frequency of an actual structure, and the natural vibration frequencies of the single-degree-of-freedom oscillators 3 are regulated by regulating the heights and the mass of the single-degree-of-freedom oscillators 3. The strain gauges 4 are vertically arranged on the bottoms of the single-degree-of-freedom oscillators 3 and used for measuring bottom strain of the single-degree-of-freedom oscillators 3 to obtain stress states of the single-degree-of-freedom oscillators 3, thereby calculating the relative displacements of the single-degree-of-freedom oscillators 3. Laser source 8 is arranged respectively on each of the single-degree-of-freedom oscillators; the photosensitive band 7 is arranged on the raft 5 and is parallel to the axes of the two rigid piles 6; the photosensitive band 7 is connected with the information collector 9; and the information collector 9 is used for collecting absolute displacements of the single-degree-of-freedom oscillators 3 at each moment.

The raft 5 is arranged on the junction of the rigid piles 6 and a foundation surface and is used for ensuring that the junction of the rigid piles and the foundation surface is static. The bidirectional electromagnetic exciter 2 is installed on the raft 5 through the bracket 1 and is positioned between the two rigid piles 6 to ensure that impact loads on the two rigid piles 6 are the same. The bidirectional electromagnetic exciter 2 can instantly eject an oscillator to impact a pile head through electromagnetic change. After the oscillator comes into full contact with the pile head, the oscillator rapidly separates from the pile head and rebounds.

A measuring method for horizontal dynamic impedance of specified foundation depth based on differential response analysis of pulse excitation is realized based on the measuring device, and a pile head reserved on the foundation has a length of $h_0$. The instantaneous acting force $F=m'ü'$ of the bidirectional electromagnetic exciter 2 on the pile head is obtained according to the acceleration ü' exerted to an excitation block by the bidirectional electromagnetic exciter 2 and the mass m'; the following physical quantities are obtained through measurement: the instantaneous acting force F of the exciter on the pile head, the mass M of a short pile, the mass M' of a long pile, a distance $h_n$ from the bottom of a soil layer to the ground surface and the mass m of the single-degree-of-freedom oscillator. A test flow comprises the following steps:

1) the bidirectional electromagnetic exciter 2 ejects the oscillator, and the oscillator comes into full contact with the pile head of the rigid pile 6 and rebounds to obtain the instantaneous acting force F; because action time is extremely short, the acting force F of the excitation block on the pile can be considered as a rectangular impulse force;

2) the vertical strain ε on the bottom of a cantilever bar of the single-degree-of-freedom oscillator 3 is measured through the strain gauge 4 on the bottom of the single-degree-of-freedom oscillator 3; the relative displacement $u_s(t)$ of the single-degree-of-freedom oscillator 3 at a certain moment is obtained through calculation; and the speed $\dot{u}_s(t)$ of the single-degree-of-freedom oscillator 3 relative to the pile head and the relative acceleration $\ddot{u}_s(t)$ are obtained through differential;

3) the displacement $u_z(t)$ of the single-degree-of-freedom oscillator 3 at a certain moment is measured through the information collector 9 by means of the laser source 8 arranged on the single-degree-of-freedom oscillator 3 and the photosensitive band 7 arranged on the raft 5; speed $\dot{u}_z(t)$ and acceleration $\ddot{u}_z(t)$ are obtained through differential; and displacement $u_q(t)$, speed $\dot{u}_q(t)$ and acceleration $\ddot{u}_q(t)$ of the pile head are obtained:

$$u_q(t)=u_z(t)-u_s(t), \dot{u}_q(t)=\dot{u}_z(t)-\dot{u}_s(t), \ddot{u}_q(t)=\ddot{u}_z(t)-\ddot{u}_s(t) \quad (1)$$

4) for the short pile a, the following dynamic equation is used:

$$M\Sigma\ddot{u}_q(t,h)+\Sigma c(h)\dot{u}_q(t,h)+\Sigma k(h)u_q(t,h)=F-m\ddot{u}_s(t) \quad (2)$$

to obtain:

$$\frac{1}{2}M\ddot{u}_q(t)\left[\frac{h_0}{h_0+h_k}+\frac{h_k}{h_0+h_k}\frac{h_k}{h_0}\right]+ \quad (3)$$

$$\frac{\dot{u}_q(t)}{h_0}\sum_{n=1}^{k}\frac{1}{2}c_n(h_n+h_{n-1})+\frac{u_q(t)}{h_0}\sum_{n=1}^{k}\frac{1}{2}k_n(h_n+h_{n-1})=F-m\ddot{u}_s(t)$$

Fourier transform is conducted on formula (3) to obtain:

$$-\frac{1}{2}\omega^2\left[\frac{h_0}{h_0+h_k}M\bar{u}_q+\frac{h_k}{h_0+h_k}M\bar{u}_q\frac{h_k}{h_0}\right]+ \quad (4)$$

$$\frac{\bar{u}_q}{h_0}\sum_{n=1}^{k}\frac{1}{2}[(i\omega c_n+k_n)(h_n+h_{n-1})]=F+\frac{1}{2}\omega^2 m\bar{u}_s$$

wherein i is an imaginary unit, and $i^2=-1$; ω is frequency; $\bar{u}$ is a displacement obtained by Fourier transform on u(t) to change with frequency; $h_0$ is a distance from the top of the pile to the ground surface; $h_k$ is a distance from a bottom surface of an upper soil layer of a soil layer of specified depth to the ground surface; $c_n$ is the damp of the nth soil layer; $k_n$ is the rigidity of the nth soil layer; $h_n$ is a distance from the bottom surface of the nth soil layer to the ground surface; $h_{n-1}$ is a distance from the bottom surface of the (n-1)th soil layer to the ground surface;

compiled as:

$$\sum_{n=1}^{k}[(i\omega c_n+k_n)(h_n+h_{n-1})]=2\frac{h_0}{\bar{u}_q}F+\frac{\bar{u}_s}{\bar{u}_q}\omega^2 mh_0+M\omega^2\left(\frac{h_0^2+h_k^2}{h_0+h_k}\right) \quad (5)$$

5) for the long pile b, the following dynamic equation is used:

$$M'\Sigma\ddot{u}_q'(t,h)+\Sigma c(h)\dot{u}_q'(t,h)+\Sigma k(h)u_q'(t,h)=F-m\ddot{u}_s'(t) \quad (6)$$

to obtain:

$$\frac{1}{2}M'\ddot{u}_q'(t)\left[\frac{h_0}{h_0+h_{k+1}}+\frac{h_{k+1}}{h_0+h_{k+1}}\frac{h_k}{h_0}\right]+ \quad (7)$$

$$\frac{\dot{u}_q'(t)}{h_0}\sum_{n=1}^{k}\frac{1}{2}c_n(h_n+h_{n-1})+\frac{u_q'(t)}{h_0}\sum_{n=1}^{k}\frac{1}{2}k_n(h_n+h_{n-1})=F-m\ddot{u}_s'(t)$$

wherein $h_{k+1}$ is the specified foundation depth;

Fourier transform is conducted on formula (7):

$$-\frac{1}{2}\omega^2\left[\frac{h_0}{h_0+h_{k+1}}M'\bar{u}_q'+\frac{h_{k+1}}{h_0+h_{k+1}}M'\bar{u}_q'\frac{h_{k+1}}{h_0}\right]+ \quad (8)$$

$$\frac{\bar{u}_q'}{h_0}\sum_{n=1}^{k+1}\frac{1}{2}[(i\omega c_n+k_n)(h_n+h_{n-1})]=F+\frac{1}{2}\omega^2 m\bar{u}_s'$$

compiled as:

$$\sum_{n=1}^{k+1}[(i\omega c+k_n)(h_n+h_{n-1})]=2\frac{h_0}{\bar{u}_q'}F+\frac{\bar{u}_s'}{\bar{u}_q'}\omega^2 mh_0+M'\omega^2\left(\frac{h_0^2+h_{k+1}^2}{h_0+h_{k+1}}\right) \quad (9)$$

$$(i\omega c_{k+1}+k_{k+1})(h_k+h_{k+1})=2\frac{h_0}{\bar{u}_q'}F+\frac{\bar{u}_s'}{\bar{u}_q'}\omega^2 mh_0+ \quad (10)$$

$$M'\omega^2\left(\frac{h_0^2+h_{k+1}^2}{h_0+h_{k+1}}\right)-\sum_{n=1}^{k}[(i\omega c_n+k_n)(h_n+h_{n-1})]$$

wherein $c_{k+1}$ is the damp of the soil layer of the specified depth; $k_{k+1}$ is the rigidity of the soil layer of the specified depth;

$$M'=\frac{h_0+h_{k+1}}{h_0+h_k}M \quad (11)$$

formula (5) and formula (11) are substituted into formula (10) which is compiled as:

$$(i\omega c_{k+1}+k_{k+1})(h_k+h_{k+1})= \quad (12)$$

$$2Fh_0\left(\frac{\bar{u}_q-\bar{u}_q'}{\bar{u}_q'\bar{u}_q}\right)+M\omega^2\left(\frac{h_{k+1}^2-h_k^2}{h_0+h_k}\right)\omega^2 mh_0\left(\frac{\bar{u}_s'}{\bar{u}_q'}-\frac{\bar{u}_s}{\bar{u}_q}\right)$$

to further obtain:

$$i\omega c_{k+1} + k_{k+1} = \frac{2Fh_0}{(h_k+h_{k+1})}\left(\frac{\bar{u}_q - \bar{u}'_q}{\bar{u}'_q \bar{u}_q}\right) + M\omega^2\left(\frac{h_{k+1}-h_k}{h_0+h_k}\right) + \frac{\omega^2 m h_0}{(h_k+h_{k+1})}\left(\frac{\bar{u}'_s}{\bar{u}'_q} - \frac{\bar{u}_s}{\bar{u}_q}\right) \quad (13)$$

6) a dynamic impedance $S_g(\omega)$ at a specified foundation depth is obtained:

$$S_g(\omega) = i\omega c_{k+1}(\omega) = k_{k+1}(\omega) \quad (14)$$

Compared with the prior art, the present invention uses two rigid piles with different lengths, and deduces the horizontal dynamic impedance value of the foundation at the penetration depth of the pile head of the long rigid pile according to the difference in the dynamic response of the rigid pile under the same pulse excitation. Beneficial effects mainly include the following three aspects:

(1) The same pulse exciting force is applied to two piles with different lengths, and the dynamic impedance at the specified foundation depth is deduced and analyzed according to the differential response of the two piles. In this way, the traditional harmonic exciting method can be avoided, and a foundation pit shall be excavated to expose the soil layer at the specified depth, thereby bringing high practicability. The differential process can skillfully overcome the difficulty of measuring the horizontal dynamic impedance distribution value of pile bodies when a single pile is penetrated.

(2) Using the bidirectional exciter, bidirectional excitation not only easily realizes the same exciting force applied to the two piles simultaneously, but also avoids external fixing devices such as reaction piles which are needed when the unidirectional horizontal exciter is used, facilitating the mobility of the device and making the experimental technology more simple and applicable.

(3) A single degree of freedom system is added to the top of the penetrating pile. The frequency of the single degree of freedom system can reflect the natural vibration frequency of the upper structure. The measured dynamic impedance of the single degree of freedom system can be used for deduction and analysis to obtain the dynamic impedance value of the foundation. The impedance value is directly the impedance value to be calculated for the dynamic response of the foundation to the specified structure. In addition, under the inherent filtration effect of the pile bodies and the single degree of freedom system, the measured value of the present invention can greatly reduce the noise problem and make the test result more reliable compared with the measured value obtained by directly measuring the dynamic response of the foundation.

In the figures: 1 bracket; 2 bidirectional electromagnetic exciter; 3 single-degree-of-freedom oscillator; 4 strain gauge; 5 raft; 6 rigid pile; 7 photosensitive band; 8 laser source; and 9 information collector.

DETAILED DESCRIPTION

Specific embodiments of the present invention are described below in detail in combination with the technical solution and drawings.

Figure 1:
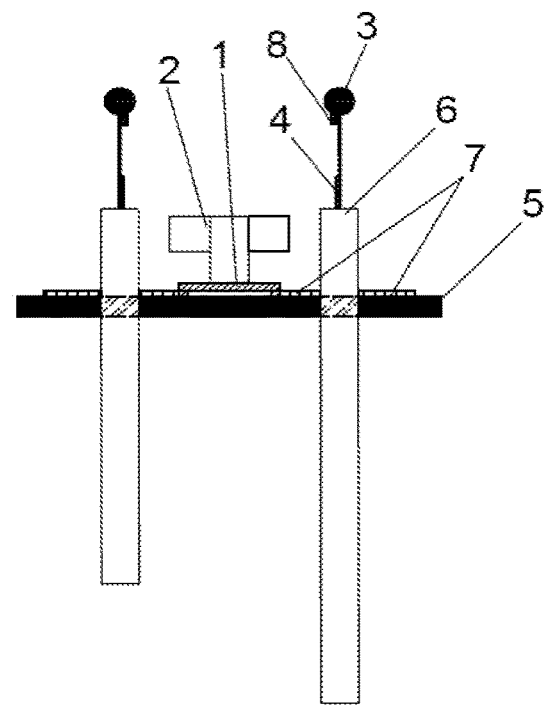
FIG. 1 is a schematic diagram of assembly of a device of the present invention.
Figure 2:
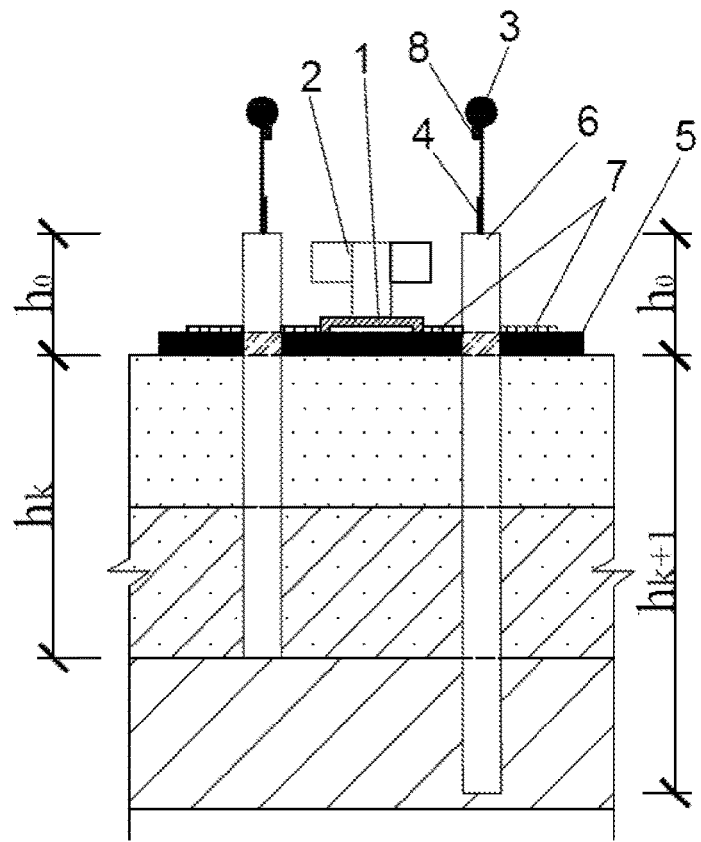
FIG. 2 is a cross-sectional view of a device of the present invention.
Figure 3:
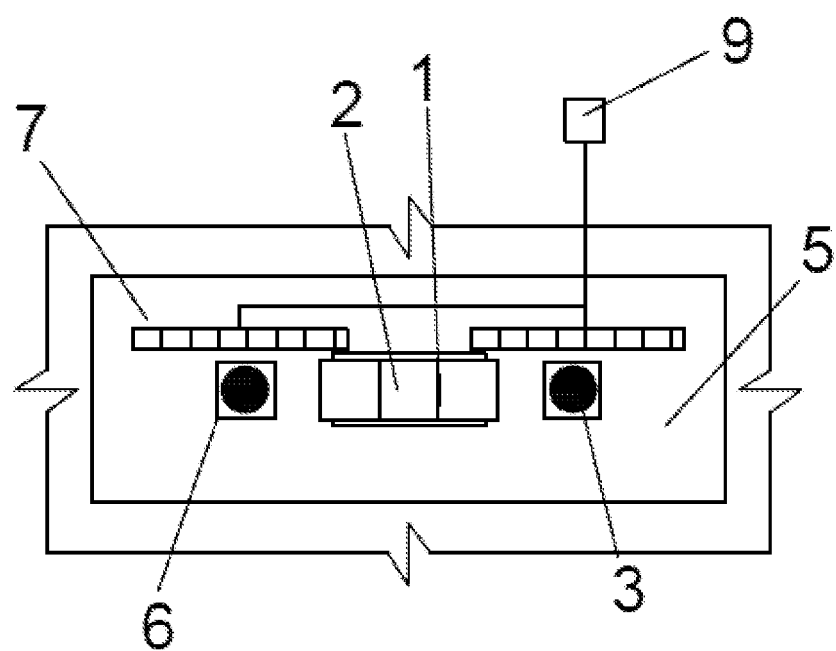
FIG. 3 is a vertical top view of site application of a device of the present invention.

Two rigid piles 6 are driven into the foundation by different depths. Pile heads reserved on the ground have a length of $h_0$. The raft 5 is arranged to ensure that the intersection of the piles and the foundation surface will not have relative displacement. As shown in FIG. 1, the bidirectional electromagnetic exciter 2 is arranged between the two piles to ensure that impact loads on the two rigid piles are the same. The bidirectional electromagnetic exciter 2 instantly ejects an oscillator to impact a pile head through electromagnetic change. After the oscillator comes into full contact with the pile head, the oscillator rapidly separates from the pile head and rebounds. The instantaneous acting force F=m'ü' of the exciter on the pile head is obtained according to the acceleration ü' exerted to an excitation block by the bidirectional electromagnetic exciter 2 and the mass m' of the excitation block. The single-degree-of-freedom oscillators 3 are arranged on pile heads, and the natural vibration frequencies of the single-degree-of-freedom oscillators 3 are regulated by regulating the heights and the mass of the single-degree-of-freedom oscillators 3. The strain gauges 4 are vertically arranged on the bottoms of the single-degree-of-freedom oscillators 3 to sensitively measure the vertical strain ε of supporting rods of the single-degree-of-freedom oscillators 3. One laser source 8 is arranged respectively on each of the single-degree-of-freedom oscillators 3; the displacement $u_z(t)$ of the single-degree-of-freedom oscillators at each moment can be measured through the photosensitive band 7 arranged at one side parallel to the axes of the two rigid piles and the information collector 9; and speed $\dot{u}_z$ and acceleration $\ddot{u}_z$ can be differentiated. The following physical quantities can be obtained through measurement: the instantaneous acting force F of the exciter on the pile head, the mass M of a short pile, the mass M' of a long pile, a distance $h_n$ from the bottom of a soil layer to the ground surface, the mass in of the single-degree-of-freedom oscillator, damp c and rigidity k.

A test flow is as follows:

1) The bidirectional electromagnetic exciter ejects the oscillator, and the oscillator comes into full contact with the pile head and rebounds to calculate the exciting force F. Because action time is extremely short, the acting force F of the excitation block on the pile can be considered as a rectangular impulse force.

2) The strain gauge is arranged on the bottom of the single-degree-of-freedom oscillator so as to measure the strain ε on the bottom of a cantilever bar; the relative displacement $u_s(t)$ of the single-degree-of-freedom oscillator is calculated; and the speed $\dot{u}_s(t)$ and the relative acceleration $\ddot{u}_s(t)$ of the single-degree-of-freedom oscillator relative to the pile head are obtained through differential.

3) The displacement $u_z(t)$ of the single-degree-of-freedom oscillator 3 at a certain moment is measured through the information collector 9 by means of the laser source 8 arranged on the single-degree-of-freedom oscillator 3 and the photosensitive band 7 arranged on the raft 5; speed $\dot{u}_z(t)$ and acceleration $\ddot{u}_z(t)$ are obtained through differential; and displacement, speed and acceleration of the pile head are obtained, as shown by formula (1).

4) For the short pile a, the dynamic equation shown by formula (2) is used to obtain:

$$\frac{1}{2}M\ddot{u}_q(t)\left[\frac{h_0}{h_0+h_k} + \frac{h_k}{h_0+h_k}\frac{h_k}{h_0}\right] + \quad (3)$$

-continued $$\frac{\dot{u}_q(t)}{h_0}\sum_{n=1}^{k}\frac{1}{2}c_n(h_n+h_{n-1})\frac{u_q(t)}{h_0}\sum_{n=1}^{k}\frac{1}{2}k_n(h_n+h_{n-1})=F-m\ddot{u}_s(t)$$

Fourier transform is conducted on formula (3) to obtain:

$$-\frac{1}{2}\omega^2\left[\frac{h_0}{h_0+h_k}M\bar{u}_q+\frac{h_k}{h_0+h_k}M\bar{u}_q\frac{h_k}{h_0}\right]+ \tag{4}$$

$$\frac{\bar{u}_q}{h_0}\sum_{n=1}^{k}\frac{1}{2}[(i\omega c_n+k_n)(h_n+h_{n-1})]=F+\frac{1}{2}\omega^2 m\bar{u}_s$$

compiled as:

$$\sum_{n=1}^{k}[(i\omega c_n+k_n)(h_n+h_{n-1})]=2\frac{h_0}{\bar{u}_q}F+\frac{\bar{u}_s}{\bar{u}_q}\omega^2 mh_0+M\omega^2\left(\frac{h_0^2+h_k^2}{h_0+h_k}\right) \tag{5}$$

5) For the long pile b, the dynamic equation shown by formula (6) is used to obtain:

$$\frac{1}{2}M'\ddot{u}_q'(t)\left[\frac{h_0}{h_0+h_{k+1}}+\frac{h_{k+1}}{h_0+h_{k+1}}\frac{h_k}{h_0}\right]+ \tag{7}$$

$$\frac{\dot{u}_q'(t)}{h_0}\sum_{n=1}^{k}\frac{1}{2}c_n(h_n+h_{n-1})+\frac{u_q'(t)}{h_0}\sum_{n=1}^{k}\frac{1}{2}k_n(h_n+h_{n-1})=F-m\ddot{u}_s'(t)$$

Fourier transform is conducted on formula (7):

$$-\frac{1}{2}\omega^2\left[\frac{h_0}{h_0+h_{k+1}}M'\bar{u}_q'+\frac{h_{k+1}}{h_0+h_{k+1}}M'\bar{u}_q'\frac{h_{k+1}}{h_0}\right]+ \tag{8}$$

$$\frac{\bar{u}_q'}{h_0}\sum_{n=1}^{k+1}\frac{1}{2}[(i\omega c_n+k_n)(h_n+h_{n-1})]=F+\frac{1}{2}\omega^2 m\bar{u}_s'$$

compiled as:

$$\sum_{n=1}^{k+1}[(i\omega c+k_n)(h_n+h_{n-1})]=2\frac{h_0}{\bar{u}_q'}F+\frac{\bar{u}_s'}{\bar{u}_q'}\omega^2 mh_0+M'\omega^2\left(\frac{h_0^2+h_{k+1}^2}{h_0+h_{k+1}}\right) \tag{9}$$

$$(i\omega c_{k+1}+k_{k+1})(h_k+h_{k+1})=2\frac{h_0}{\bar{u}_q'}F+\frac{\bar{u}_s'}{\bar{u}_q'}\omega^2 mh_0+ \tag{10}$$

$$M'\omega^2\left(\frac{h_0^2+h_{k+1}^2}{h_0+h_{k+1}}\right)-\sum_{n=1}^{k}[(i\omega c_n+k_n)(h_n+h_{n-1})]$$

wherein $$M'=\frac{h_0+h_{k+1}}{h_0+h_k}M \tag{11}$$

formula (5) and formula (11) are substituted into formula (10) which is compiled as:

$$(i\omega c_{k+1}+k_{k+1})(h_k+h_{k+1})= \tag{12}$$

-continued $$2Fh_0\left(\frac{\bar{u}_q-\bar{u}_q'}{\bar{u}_q'\bar{u}_q}\right)+M\omega^2\left(\frac{h_{k+1}^2-h_k^2}{h_0+h_k}\right)\omega^2 mh_0\left(\frac{\bar{u}_s'}{\bar{u}_q'}-\frac{\bar{u}_s}{\bar{u}_q}\right)$$

to further obtain:

$$i\omega c_{k+1}+k_{k+1}= \tag{13}$$

$$\frac{2Fh_0}{(h_k+h_{k+1})}\left(\frac{\bar{u}_q-\bar{u}_q'}{\bar{u}_q'\bar{u}_q}\right)+M\omega^2\left(\frac{h_{k+1}-h_k}{h_0+h_k}\right)+\frac{\omega^2 mh_0}{(h_k+h_{k+1})}\left(\frac{\bar{u}_s'}{\bar{u}_q'}-\frac{\bar{u}_s}{\bar{u}_q}\right)$$

6) A dynamic impedance $S_g(\omega)$ at a specified foundation depth is obtained:

$$S_g(\omega)=i\omega c_{k+1}(\omega)=k_{k+1}(\omega) \tag{14}$$

The present invention has the operating principle that:

(1) The horizontal dynamic impedance at the specified foundation depth is calculated according to the differential response of pulse excitation. It is not practical to calculate the dynamic impedance at the specified foundation depth based only on the response of one pile. The two rigid piles embedded into different foundation depths bear different lateral force of the soil layer, so that motion characteristics in the process of collision impact with the outside are different. Dynamic impedance at the specified foundation depth is deduced from the formula according to the differential response.

(2) The bidirectional electromagnetic exciter 2 is used to apply equal pulse loads to the rigid piles 6 (penetrating piles). The base shear force can be calculated by the product of the mass of the upper design structure and the design seismic acceleration so as to calculate the shear force at the top of a single pile. In the test, an acceleration can be applied to the excitation block by using the bidirectional electromagnetic exciter 2, so that the exciting force of the excitation block on the single pile is approximately equal to the calculated actual shear force at the top of the single pile. Thus, the equivalent relationship between the test device and the actual structure is established so that the measured dynamic impedance of the foundation has practical significance.

(3) The single degree of freedom system with the designated frequency is arranged on the pile in order to reflect the frequency of the actual upper structure. The natural vibration frequency of the upper structure is adjusted, so as to reflect the dynamic influence of the dynamic impedance of the foundations of different depths on the structures with different natural frequency features. Specifically, the frequency of the single degree of freedom system is regulated by regulating the heights and the mass of the single-degree-of-freedom oscillators 3. The speed and the acceleration can be obtained by the differential of the measured maximum amplitude of the single degree of freedom system. The dynamic stiffness of the foundation at the frequency is calculated according to the formula. Thus, the result can be directly applied to the actual upper structure.

The above embodiments only express the implementation of the present invention, and shall not be interpreted as a limitation to the scope of the patent for invention. It should be noted that, for those skilled in the art, several variations and improvements can also be made without departing from the concept of the present invention, all of which belong to the protection scope of the present invention.

The invention claimed is:

1. A measuring device for horizontal dynamic impedance of specified foundation depth based on differential response analysis of pulse excitation, the measuring device comprising a bracket (1), a bidirectional electromagnetic exciter (2), single-degree-of-freedom oscillators (3), strain gauges (4), a raft (5), two rigid piles (6), a photosensitive band (7), laser sources (8) and an information collector (9), wherein the two rigid piles (6) with different lengths are embedded into different foundation depths; the single-degree-of-freedom oscillators (3) with different frequencies are arranged on pile heads of the two rigid piles (6) according to the frequency of an actual structure, and the natural vibration frequencies of the single-degree-of-freedom oscillators (3) are regulated by regulating the heights and the mass of the single-degree-of-freedom oscillators (3); the strain gauges (4) are vertically arranged on the bottoms of the single-degree-of-freedom oscillators (3) and used for measuring bottom strain of the single-degree-of-freedom oscillators (3); laser source (8) is arranged respectively on each of the single-degree-of-freedom oscillators; absolute displacements of the single-degree-of-freedom oscillators (3) at each moment are measured through the photosensitive band (7) arranged at one side parallel to the axes of the two rigid piles (6) and the information collector (9) connected with the photosensitive band (7);

the raft (5) is arranged on the junction of the rigid piles (6) and a foundation surface and is used for ensuring that the junction of the rigid piles and the foundation surface is static; the bidirectional electromagnetic exciter (2) is installed on the raft (5) through the bracket (1) and is positioned between the two rigid piles (6) to ensure that impact loads on the two rigid piles (6) are the same; the bidirectional electromagnetic exciter (2) can instantly eject an oscillator to impact a pile head through electromagnetic change.

2. A measuring method for horizontal dynamic impedance of specified foundation depth based on differential response analysis of pulse excitation, wherein the measuring method is realized based on the measuring device, and a pile head reserved on the foundation has a length of $h_0$; the instantaneous acting force $F=m'\ddot{u}'$ of the bidirectional electromagnetic exciter (2) on the pile head is obtained according to the acceleration $\ddot{u}'$ exerted to an excitation block by the bidirectional electromagnetic exciter (2) and the mass $m'$ of the excitation block; the following physical quantities are obtained through measurement: the instantaneous acting force F of the exciter on the pile head, the mass M of a short pile, the mass $M'$ of a long pile, a distance $h_n$ from the bottom of a soil layer to the ground surface and the mass m of the single-degree-of-freedom oscillator; the method specifically comprises the following steps:

1) the bidirectional electromagnetic exciter (2) ejects the oscillator, and the oscillator comes into full contact with the pile head of the rigid pile (6) and rebounds to obtain the instantaneous acting force F;

2) the vertical strain ε on the bottom of a cantilever bar of the single-degree-of-freedom oscillator (3) is measured through the strain gauge (4) on the bottom of the single-degree-of-freedom oscillator (3); the relative displacement $u_s(t)$ of the single-degree-of-freedom oscillator (3) at a certain moment is obtained through calculation; and the speed $\dot{u}_s(t)$ of the single-degree-of-freedom oscillator (3) relative to the pile head and the relative acceleration $\ddot{u}_s(t)$ are obtained through differential;

3) the displacement $u_z(t)$ of the single-degree-of-freedom oscillator (3) at a certain moment is measured through the information collector (9) by means of the laser source (8) arranged on the single-degree-of-freedom oscillator (3) and the photosensitive band (7) arranged on the raft (5); speed $\dot{u}_z(t)$ and acceleration $\ddot{u}_z(t)$ are obtained through differential; and displacement $u_q(t)$, speed $\dot{u}_q(t)$ and acceleration $\ddot{u}_q(t)$ of the pile head are obtained:

$$u_q(t)=u_z(t)-u_s(t), \dot{u}_q(t)=\dot{u}_z(t)-\dot{u}_s(t), \ddot{u}_q(t)=\ddot{u}_z(t)-\ddot{u}_s(t) \qquad (1)$$

4) for the short pile a, the following dynamic equation is used:

$$M\Sigma\ddot{u}_q(t,h)+\Sigma c(h)\dot{u}_q(t,h)+\Sigma k(h)u_q(t,h)=F-m\ddot{u}_s(t) \qquad (2)$$

to obtain:

$$\sum_{n=1}^{k}[(i\omega c_n+k_n)(h_n+h_{n-1})]=2\frac{h_0}{\bar{u}_q}F+\frac{\bar{u}_s}{\bar{u}_q}\omega^2 mh_0+M\omega^2\left(\frac{h_0^2+h_k^2}{h_0+h_k}\right) \qquad (5)$$

wherein i is an imaginary unit, and $i^2=-1$; ω is frequency; $h_0$ is a distance from the top of the pile to the ground surface; $h_k$ is a distance from a bottom surface of an upper soil layer of a soil layer of specified depth to the ground surface; $c_n$ is the damp of the nth soil layer; $k_n$ is the rigidity of the nth soil layer; $h_n$ is a distance from the bottom surface of the nth soil layer to the ground surface; $h_{n-1}$ is a distance from the bottom surface of the (n−1)th soil layer to the ground surface;

5) for the long pile b, the following dynamic equation is used:

$$M'\Sigma\ddot{u}_q'(t,h)+\Sigma c(h)\dot{u}_q'(t,h)+\Sigma k(h)u_q'(t,h)=F-m\ddot{u}_s'(t) \qquad (6)$$

to obtain:

$$\sum_{n=1}^{k+1}[(i\omega c+k_n)(h_n+h_{n-1})]=2\frac{h_0}{\bar{u}_q'}F+\frac{\bar{u}_s'}{\bar{u}_q'}\omega^2 mh_0+M'\omega^2\left(\frac{h_0^2+h_{k+1}^2}{h_0+h_{k+1}}\right) \qquad (9)$$

$$(i\omega c_{k+1}+k_{k+1})(h_k+h_{k+1})=2\frac{h_0}{\bar{u}_q'}F+\frac{\bar{u}_s'}{\bar{u}_q'}\omega^2 mh_0+ \qquad (10)$$
$$M'\omega^2\left(\frac{h_0^2+h_{k+1}^2}{h_0+h_{k+1}}\right)-\sum_{n=1}^{k}[(i\omega c_n+k_n)(h_n+h_{n-1})]$$

wherein $c_{k+1}$ is the damp of the soil layer of the specified depth; $k_{k+1}$ is the rigidity of the soil layer of the specified depth; $h_{k+1}$ is the specified foundation depth;

$$\text{wherein } M'=\frac{h_0+h_{k+1}}{h_0+h_k}M \qquad (11)$$

formula (5) and formula (11) are substituted into formula (10) which is compiled as:

$$(i\omega c_{k+1}+k_{k+1})(h_k+h_{k+1})= \qquad (12)$$
$$2Fh_0\left(\frac{\bar{u}_q-\bar{u}_q'}{\bar{u}_q'\bar{u}_q}\right)+M\omega^2\left(\frac{h_{k+1}^2-h_k^2}{h_0+h_k}\right)\omega^2 mh_0\left(\frac{\bar{u}_s'}{\bar{u}_q'}-\frac{\bar{u}_s}{\bar{u}_q}\right)$$

to further obtain:

$$i\omega c_{k+1} + k_{k+1} = \frac{2Fh_0}{(h_k + h_{k+1})}\left(\frac{\bar{u}_q - \bar{u}'_q}{\bar{u}'_q \bar{u}_q}\right) + M\omega^2\left(\frac{h_{k+1} - h_k}{h_0 + h_k}\right) + \frac{\omega^2 m h_0}{(h_k + h_{k+1})}\left(\frac{\bar{u}'_s}{\bar{u}'_q} - \frac{\bar{u}_s}{\bar{u}_q}\right) \quad (13)$$

6) a dynamic impedance $S_g(\omega)$ at a different foundation depth is obtained:

$$S_g(\omega) = i\omega c_{k+1}(\omega) = k_{k+1}(\omega) \quad (14).$$

* * * * *